(12) United States Patent
Guichard et al.

(10) Patent No.: US 12,255,754 B2
(45) Date of Patent: Mar. 18, 2025

(54) HIGH-SPEED, HALF-DUPLEX COMMUNICATION WITH STANDARD MICROCONTROLLER

(71) Applicant: SERCEL, Carquefou (FR)

(72) Inventors: Florent Guichard, Nantes (FR); Thomas Girard, Nantes (FR); Freddy Excoffier, Nantes (FR)

(73) Assignee: SERCEL, Carquefou (FR)

( * ) Notice: Subject to any disclaimer, the term of this patent is extended or adjusted under 35 U.S.C. 154(b) by 242 days.

(21) Appl. No.: 18/101,342

(22) Filed: Jan. 25, 2023

(65) Prior Publication Data

US 2024/0250844 A1    Jul. 25, 2024

(51) Int. Cl.
*H04L 12/40* (2006.01)
*H04L 25/49* (2006.01)

(52) U.S. Cl.
CPC .... *H04L 12/40032* (2013.01); *H04L 25/4904* (2013.01)

(58) Field of Classification Search
CPC .......... H04L 12/40032; H04L 25/4904; H04L 67/12; H04L 67/125; H04L 67/04; H04L 67/06; H04L 69/324; H04L 69/325; H04W 4/38; G01V 1/003; G01V 1/181; G01V 1/3808; G01V 1/3843; G01V 1/162; G01V 1/164; G01V 1/189; G01V 1/22; G06F 1/1632; G06F 13/10; G06F 13/4291; G06F 13/382; G06F 13/385; G06F 13/387; G06F 13/4226; G06F 3/007; G06F 3/01; G06F 2003/0697; G06F 3/0601; G06F 3/0668; G06F 3/067; G06F 3/0671; G06F 3/0685; G06F 3/0688; G06F 3/0689; G06F 13/38; G06F 2213/40; G16Y 40/10; G16Y 40/20; G16Y 40/30; H01R 13/518; H01R 33/06;
(Continued)

(56) References Cited

U.S. PATENT DOCUMENTS 7,668,044 B2      2/2010 Brinkman et al.
10,649,945 B1 *   5/2020 Geerling ............. G06F 13/4068
(Continued)

FOREIGN PATENT DOCUMENTS

WO      2013015795 A1    1/2013

OTHER PUBLICATIONS

International Search Report/Written Opinion dated Jun. 12, 2024 in related/corresponding PCT Application No. PCT/IB2024/000025.

*Primary Examiner* — Greg C Bengzon
(74) *Attorney, Agent, or Firm* — PATENT PORTFOLIO BUILDERS PLLC

(57) ABSTRACT

A communication system includes a node configured to collect ambient data with a sensor, and a docking station configured to couple to the node and to establish a communication path with the node through only one signal along one or two wires. The node includes a first module configured to use a first data communication protocol for receiving commands from the docking station along the communication path, and a second module configured to use a second data communication protocol for sending the ambient data to the docking station along the communication path. The first data communication protocol is different from the second data communication protocol, the first data communication protocol is asynchronous and the second data communication protocol is a modified synchronous protocol.

15 Claims, 16 Drawing Sheets

(58) Field of Classification Search
CPC ...... H01R 33/90; H02J 7/0013; H02J 7/0044; H02J 7/0045
See application file for complete search history.

(56) References Cited

U.S. PATENT DOCUMENTS

| | | | |
|---|---|---|---|
| 11,022,708 B2 | 6/2021 | Bernard et al. | |
| 2013/0064321 A1* | 3/2013 | Kopp | G06F 13/4282 375/295 |
| 2013/0282928 A1* | 10/2013 | Winestein | G06F 13/385 710/63 |
| 2015/0378960 A1* | 12/2015 | Huffman | G06F 13/4072 710/313 |
| 2016/0305797 A1* | 10/2016 | Pietrasik | H04W 4/80 |
| 2017/0168777 A1* | 6/2017 | Britt | G06F 8/20 |
| 2017/0171165 A1* | 6/2017 | Britt | H04L 63/0428 |
| 2017/0351504 A1* | 12/2017 | Riedl | H04L 67/34 |
| 2017/0351505 A1* | 12/2017 | Riedl | G06F 3/0484 |
| 2018/0046595 A1* | 2/2018 | Pitigoi-Aron | G06F 13/4022 |
| 2019/0373627 A1* | 12/2019 | Luo | H04W 24/10 |
| 2021/0080599 A1 | 3/2021 | Gregoire et al. | |
| 2021/0349846 A1* | 11/2021 | Xu | G06F 13/4291 |
| 2022/0149850 A1* | 5/2022 | Sohail | G06F 11/3656 |
| 2022/0179657 A1* | 6/2022 | Barry | G06F 12/0284 |
| 2022/0179810 A1* | 6/2022 | Lendre | G06F 13/28 |
| 2022/0327091 A1* | 10/2022 | Wise | G06F 1/3206 |
| 2022/0350773 A1* | 11/2022 | Ryan | H04L 12/413 |
| 2023/0106054 A1* | 4/2023 | He | G08B 21/10 340/690 |
| 2023/0237001 A1* | 7/2023 | Lambert | G06F 13/382 375/257 |

* cited by examiner

| Max flow rate | Classic architecture | Invention with interface up to 50 Mbps | Invention with interface up to 100 Mbps |
|---|---|---|---|
| Node → Rack | 15 Mbps | 43 Mbps | 80 Mbps |
| Rack → Node | 15 Mbps | 15 Mbps | 15 Mbps |

FIG. 11

HIGH-SPEED, HALF-DUPLEX COMMUNICATION WITH STANDARD MICROCONTROLLER

BACKGROUND OF THE INVENTION

Technical Field

Embodiments of the subject matter disclosed herein generally relate to a system and method for exchanging data between a node and a corresponding docking station, and more particularly, to increasing a communication speed between the node and the docking station for those situations in which the node has a legacy microcontroller that is configured only for communication through asymmetrical data flow using a half-duplex link.

Discussion of the Background

Today there are many legacy devices, and even non-legacy devices, that use old communication protocols, like the Universal Asynchronous Receiver/Transmitter (UART) protocol. As these devices are part of a larger system or network, which was designed to use the UART protocol, upgrading them to more modern communication protocols like universal serial bus (USB), ethernet, Bluetooth, WiFi, etc. is not practical. Further, most of these systems are configured to use a single-ended or differential signals, which are supported by one or two wire communication paths, and thus, even if desired, they cannot be upgraded to the more modern protocols, which require a communication path having four or more wires.

Most known UART-based systems include old computers, mouse, keyboards and printers. Today, the UART protocol is mainly used by electronics such as GPS modules, Bluetooth modules, and RFID card reader modules, to connect to the Rasberry Pi, Arduindo, or other microcontrollers.

A less known field that still uses the UART protocol is the seismic surveying and processing field, which uses plural nodes for surveying a large area before drilling wells to explore subsurface resources, like oil, gas, hydrothermal fluids, ore, etc. Such a system is the seismic survey 100, which is illustrated in FIG. 1, and includes hundreds if not thousands of wireless seismic nodes 110, which are distributed over an area 120 of interest for recording seismic signals. The wireless seismic nodes 110 can be placed according to a given orderly pattern over the area 120, or in any other way. The wireless seismic nodes 110 may be configured to exchange (non-seismic) data between them, in an ad-hoc network. In one implementation, the wireless seismic nodes 110 communicate with a general controller 130 and can receive instructions or commands from this controller. Note that no seismic data is exchanged with the controller 130. In another implementation, a harvester 140 having its own antenna 142 and processing capabilities 144 can move about each node and collect the stored seismic data. Each seismic node 110 includes dedicated electronics (microprocessor that uses the UART protocol, storage device, e.g., a memory, transceiver) that is housed inside the node, and may have an antenna 112 that extends outside the housing, for wireless communication with the harvester. The recording of the seismic signals can be implemented in various ways, for example, in short periods of time repeated over a long period of time, or continuously over a long period of time. Regardless of the method selected for recording the seismic data, the seismic nodes 110 have a limited amount of electrical power for functioning and also a limited amount of memory for recording the seismic data. The electrical power constraints are further exacerbated by the need of the nodes to communicate among themselves for various reasons, which are not of interest here, and/or with a harvester device that might pass the area of interest for collecting quality control seismic data, and/or with one or more servers. In one embodiment, the seismic nodes 110 are configured to receive GPS signals for providing a time stamp to the recorded data and/or also for obtaining the geographical coordinates of the node. All these acts use up the limited electrical energy stored by each node and eventually the battery of the node gets depleted and needs to be recharged.

When a seismic node 110 runs low on power or when the storage area for the seismic data is full, it needs intervention from the operator of the seismic survey. Typically, for such situations, the operator of the seismic survey either collects all the seismic nodes and takes them to a maintenance facility for recharging them and downloading the seismic data, or the operator drives a vehicle equipped with a power source and a UART based communication port, connects this power source and communication port to each seismic node, and recharges their batteries and retrieves the seismic data. U.S. Pat. No. 7,668,044, the entire content of which is incorporated herein by reference, discloses a system that is configured to receive plural identical wireless seismic nodes for battery recharging and data downloading, as illustrated in FIG. 2, which corresponds to FIG. 1H of this reference. The system 200 includes plural charging modules 193, which are connected to corresponding ports 190. The seismic nodes (not shown) are attached to the ports 190 for recharging. A flow of the recharging energy may be regulated by a power breaker 191. The system 200 also includes power supplies 187 for each charging module 193. Data flows from the charging modules 193 to a host computer 183. FIG. 2 also shows a data-reduction computer 140, that is connected to the host computer 183, and is configured to implement an analysis of the received data. Note that the system shown in FIG. 2 utilizes the ethernet protocol between the host computer 183 and the charge modules 193, and the UART protocol between the nodes (not shown) and the charge modules 193. This means that the ports 190 are UART ports.

U.S. Pat. No. 11,022,708, assigned to the assignee of the present application, (the entire content of which is incorporated herein by reference) illustrates another docking station that is capable to recharge the batteries of the nodes 110 and also to retrieve the stored seismic data. Both these systems use the UART protocol as there is only a single signal link between the docking station and the nodes, so that only half-duplex communication is possible.

A main limitation of the half-duplex single signal communication systems based on the UART protocol is their speed, i.e., no more than 20 Mbps may be transferred with a microcontroller, whereas specific transceivers are up to 50 Mbps. For a typical seismic survey, the amount of the collected seismic data is large, in the order of Terabytes of data. Thus, with such a small transfer speed between the nodes and the docking station, the time necessary to refresh the nodes can take hours, which is unacceptable for a seismic survey, as these surveys are very costly and need to transfer the seismic data in matters of minutes.

Thus, there is a need for a system that can quickly transfer the seismic data from the plural seismic nodes to the docking station, without the need to update or change exiting the one-signal communication hardware.

SUMMARY OF THE INVENTION

According to an embodiment, there is a communication system that includes a node configured to collect ambient data with a sensor, and a docking station configured to couple to the node and to establish a communication path with the node through only one signal along one or two wires. The node includes a first module configured to use a first data communication protocol for receiving commands from the docking station along the communication path, and a second module configured to use a second data communication protocol for sending the ambient data to the docking station along the communication path. The first data communication protocol is different from the second data communication protocol, the first data communication protocol is asynchronous and the second data communication protocol is a modified synchronous protocol.

According to another embodiment, there is a seismic data acquisition node that includes a housing, a seismic sensor attached to the housing, and a microprocessor configured to receive seismic data collected by the seismic sensor and transmit the seismic data to a docking station. The node is configured to establish a communication path with the docking station through only a single signal along one or two wires and the microprocessor includes a first module configured to use a first data communication protocol for receiving commands from the docking station along the communication path, and a second module configured to use a second data communication protocol for sending the seismic data to the docking station along the communication path. The first data communication protocol is different from the second data communication protocol, the first data communication protocol is asynchronous, and the second data communication protocol is a modified synchronous protocol.

According to yet another embodiment, there is a docking station for receiving seismic data from a seismic node, and the docking station includes a housing, a half-duplex transceiver located in the housing and connected to the seismic node through a communication path having only one or two wires, a field programmable gate array, FPGA, located in the housing and functionally connected to the half-duplex transceiver, and a microprocessor located in the housing and functionally connected to the FPGA. The FPGA is configured to decode the seismic data received from the node along the communication path using a Serial Peripheral Interface, SPI, protocol.

According to still another embodiment, there is a communication system that includes a node configured to collect ambient data with a sensor and a docking station configured to couple to the node and to establish a communication path with the node through only one signal along one or two wires. The node includes first module configured to use a data communication protocol for receiving commands from the docking station along the communication path, and a second module configured to use a same data communication protocol for sending the ambient data to the docking station along the communication path. The data communication protocol is a modified synchronous protocol in which the node and the docking station do not exchange a clock signal.

BRIEF DESCRIPTION OF THE DRAWINGS

For a more complete understanding of the present invention, reference is now made to the following descriptions taken in conjunction with the accompanying drawings, in which:

FIG. 11 shows the performance of a classic node-docking station architecture that uses the UART protocol for both communication directions, and also the performance of the novel system that uses the UART protocol for the docking station to the node data flow and the SPI protocol for the node to the docking station data flow;

DETAILED DESCRIPTION OF THE INVENTION

Figure 1:
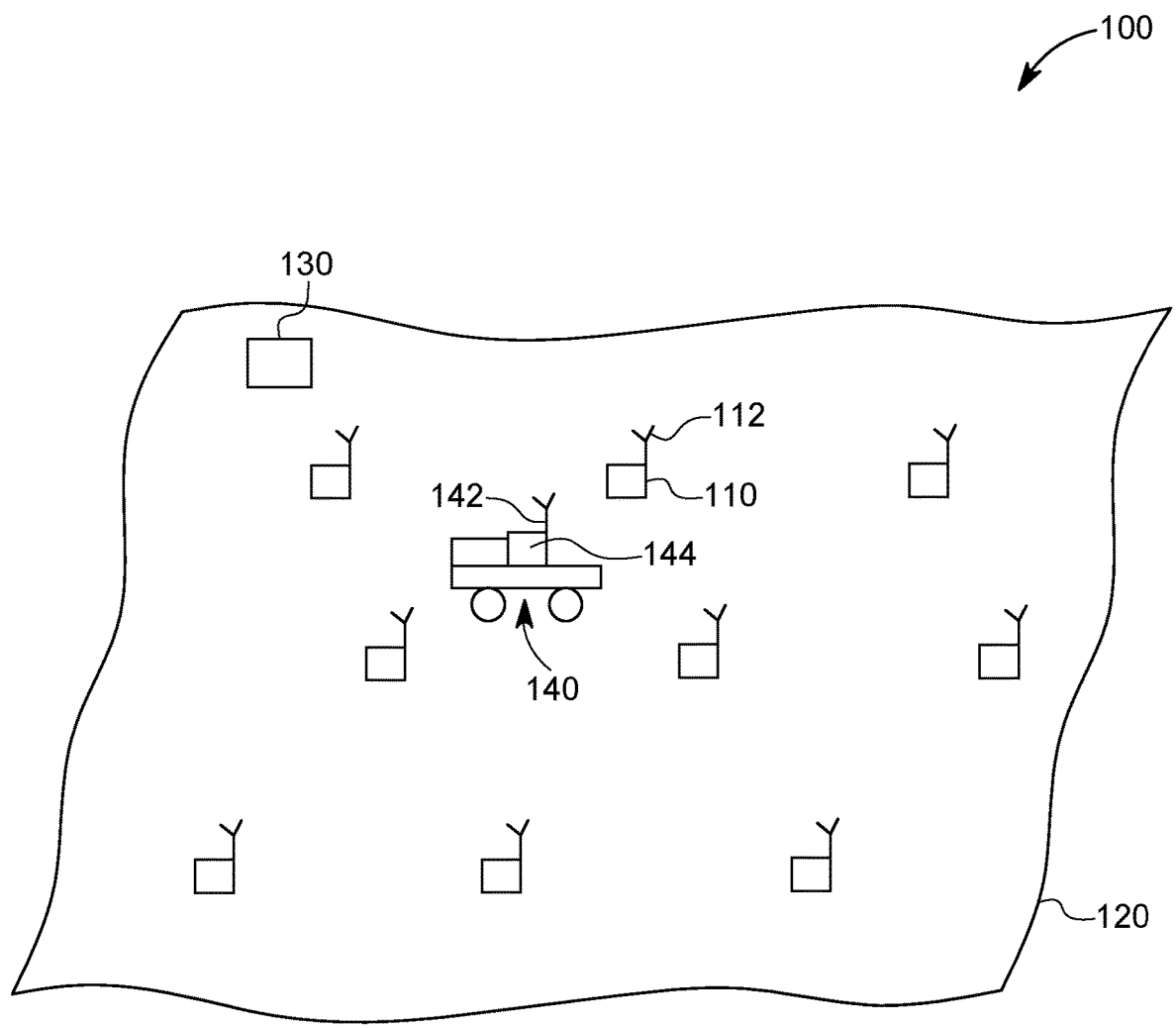
FIG. 1 is a schematic diagram of a land seismic acquisition system having plural nodes.
Figure 2:
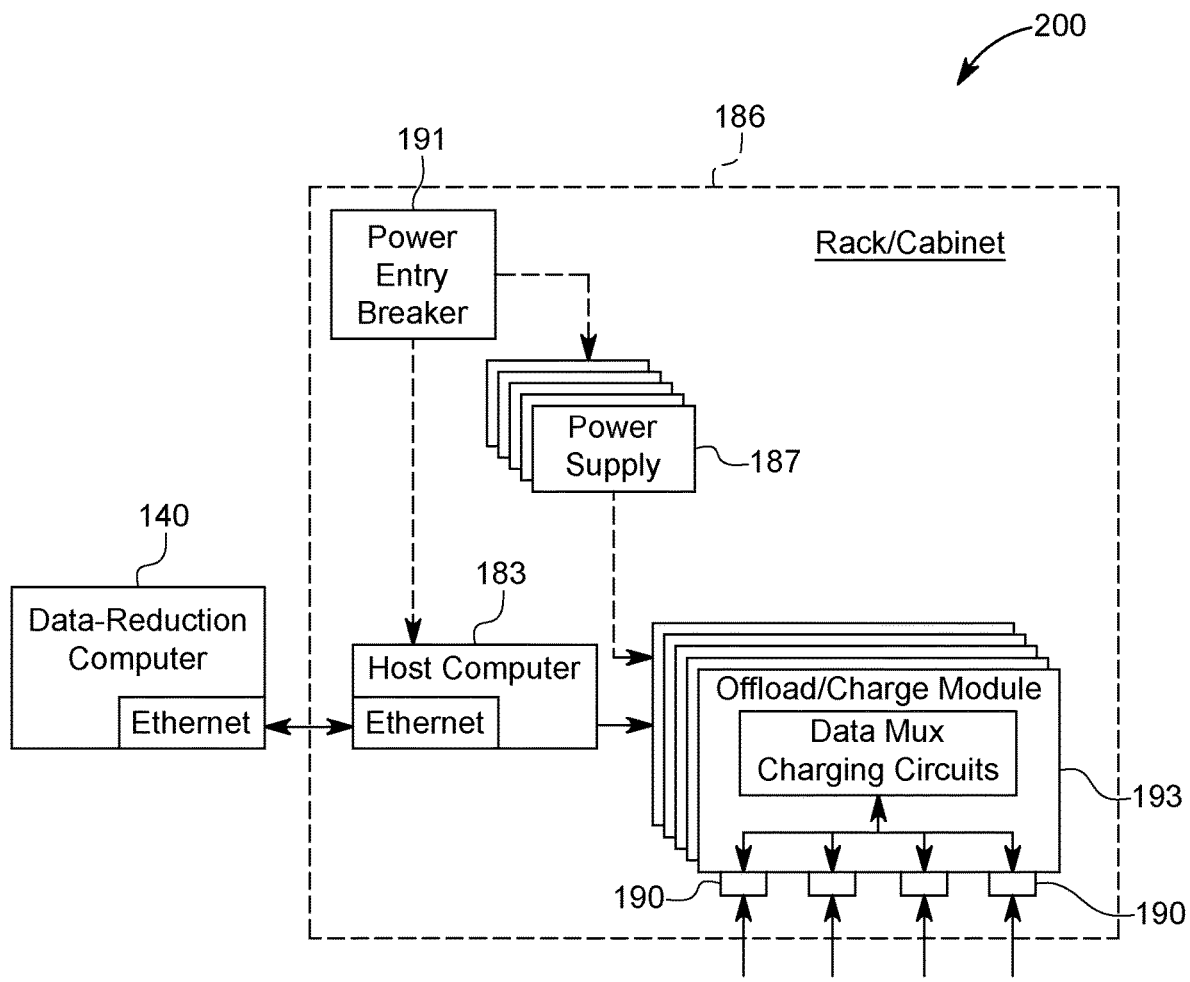
FIG. 2 is a schematic diagram of a system having plural charging modules configured to charge plural nodes and collect their stored information using UART modules.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a seismic node and a corresponding docking station for transferring seismic data from the seismic node to the docking station. However, the embodiments to be discussed next are not limited to seismic systems, but may be applied to other systems that are limited to one one-signal communication protocols.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

According to an embodiment, a node and corresponding docking station are reconfigured to use the SPI protocol when the data from the node is transmitted to the docking station and to use the UART protocol for a communication from the docking station to the node, where the node is connected through a one-signal only communication channel to the docking station. Any system that has a first subsystem communicating with a second subsystem through a one-signal only channel, and uses half-duplex, asymmetric communication protocol is defined herein as a "legacy system." For a better understanding of the invention, a brief discussion of the SPI and UART protocols is first presented.

Figure 3A:
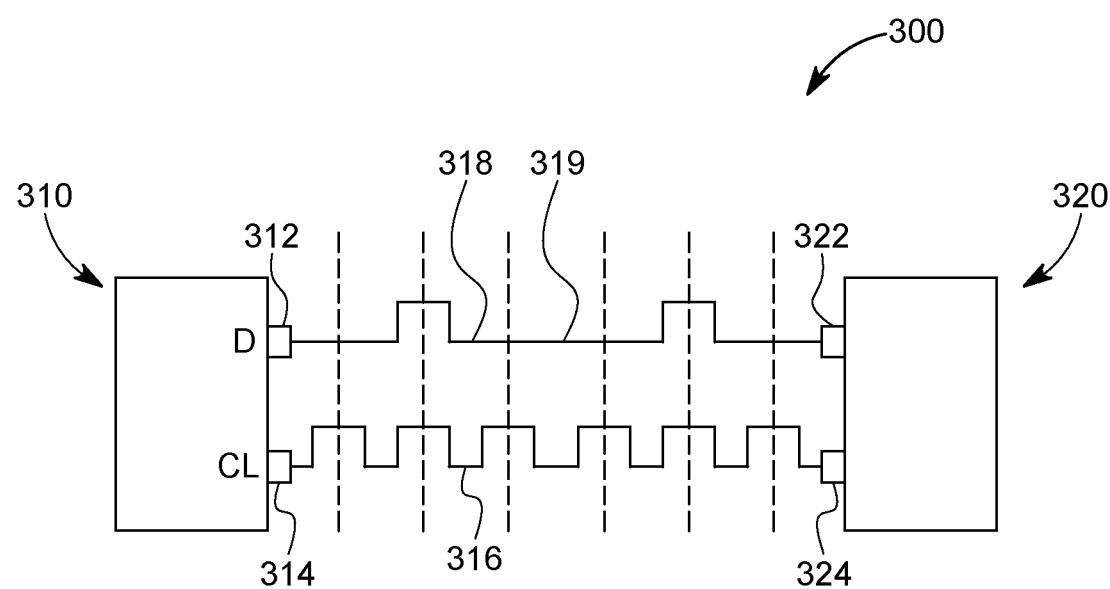
FIGS. 3A and 3B schematically illustrate the serial and parallel data transmission with a symmetrical protocol that uses a clock signal for synchronizing the transmitter and receiver.
Figure 3B:
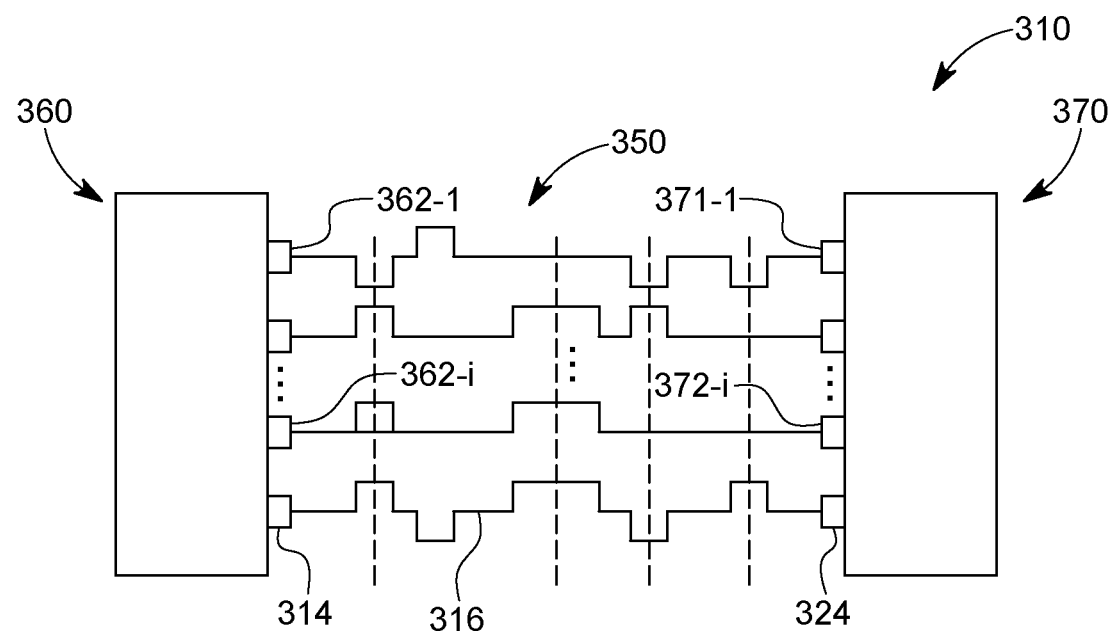

The data can be exchanged between two electronic devices in series or parallel. A series communication link is illustrated in FIG. 3A between a first subsystem 310 and a second subsystem 320 of the system 300. The first subsystem can be any legacy or non-legacy device, for example, a seismic node, a computer, a sensor, etc. The second subsystem may be the docking station, a computer, a sensor, etc. Each subsystem, e.g., subsystem 310, includes a data port 312 and a clock port 314. The clock port 314 transmits a clock signal 316 to the clock port 324 of the other subsystem 320. The data port 312 of the first subsystem 310 transmits the data D to the corresponding data port 322 of the second subsystem 320. Because of the clock signal 316, this system is a synchronous communication system as the two subsystems 310 and 320 need to synchronize their clocks CL. The data D is transmitted as a signal 318 along the single-wire 319. FIG. 3B shows a synchronous parallel communication system 350, in which plural bits of information are simultaneously transmitted along plural channels. Each subsystem 360 and 370 includes plural ports 362-1 and 372-1, and one clock channel.

Figure 4:
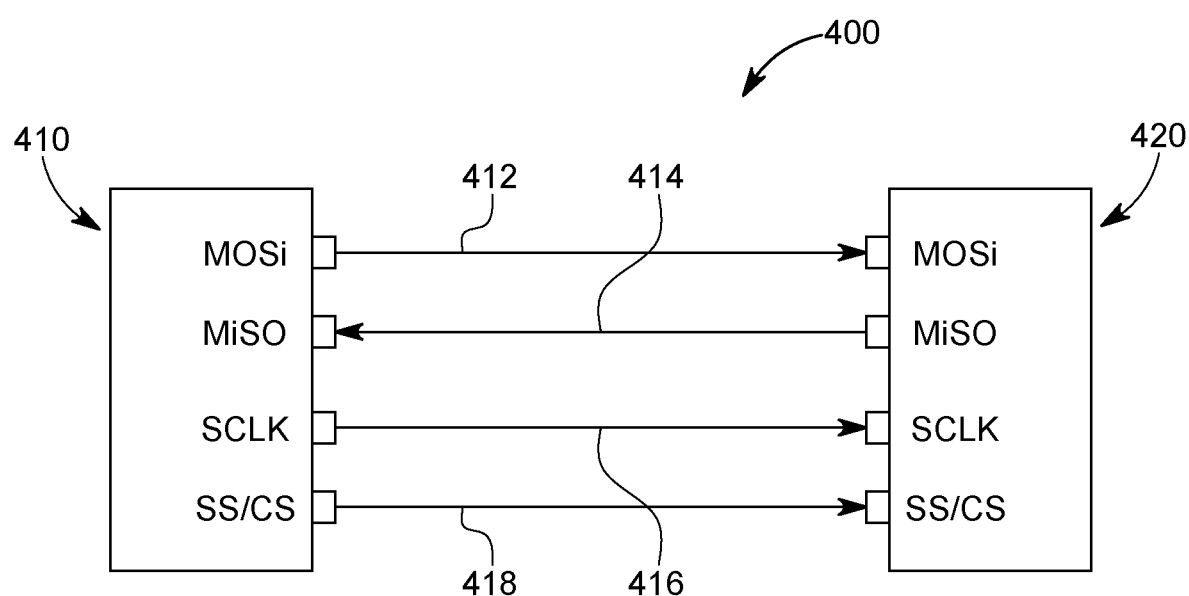
FIG. 4 schematically illustrates a Serial Peripheral Interface (SPI) based system for exchanging data.

A SPI based system 400 is configured as shown in FIG. 4, i.e., has a first subsystem 410 and a second subsystem 420 that communicate along four different channels. A first channel 412 is supported by a first line for the master 410 to send data to the slave 420 (from a master output slave input, MOSI pin to a MOSI pin), a second channel 414 is supported by a second line for the slave to send data to the master 410 (from the slave to the master, i.e., main in, subnode out, MISO), a third channel 416 is supported by a line for the clock signal (SCLK pins), and a fourth channel 418 is supported by a line for the master 410 to select which slave 420 to send data to (chip select CS pin). Thus, the SPI protocol is symmetric and uses at least four physical lines/wires for ensuring the communication between two subsystems. For this case, the data can be transferred without interruption, i.e., any number of bits may be transmitted in a continuous stream.

The SPI works by having the clock signal synchronizing the output of data bits from the master to the sampling of bits by the slave. One bit of data is transferred in each clock cycle, so the speed of data transfer is determined by the frequency of the clock signal. The SPI communication is always initiated by the master since the master configures and generates the clock signal. The master 410 sends data to the slave 420 bit by bit, in serial through the MOSI line. The slave receives the data sent from the master at the MOSI port. Data sent from the master to the slave is usually sent with the most significant bit first. The slave can also send data back to the master through the MISO line in serial. The data sent from the slave back to the master is usually sent with the least significant bit first. An advantage of the SPI protocol is that there are no start and stop bits, so that the data can be continuously transmitted, without interruption. The system has separated MISO and MOSI lines so that the data can be sent and received at the same time, i.e., is it full duplex.

Figure 5A:
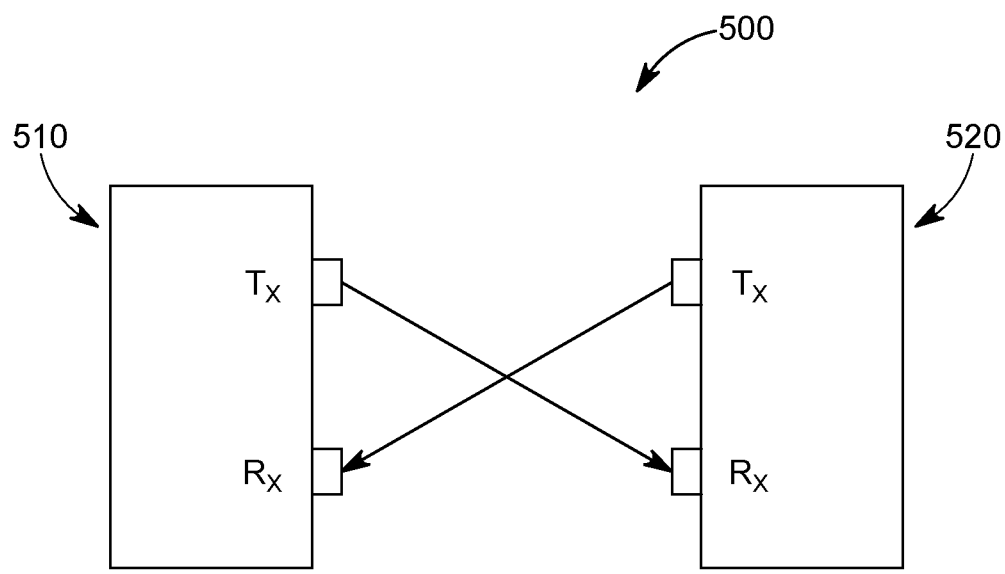
FIGS. 5A and 5B schematically illustrate an UART based system for exchanging data.
Figure 5B:
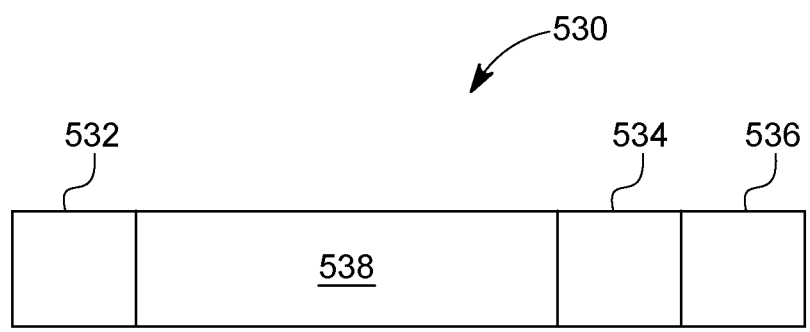

Different from this protocol, the UART protocol transmits data asynchronously, which means that there is no clock signal to synchronize the output of bits from the transmitting UART to the sampling of bits by the receiving UART. Such a system 500 is illustrated in FIG. 5A. Instead of a clock signal, the transmitting UART 510 adds start and stop bits to the data packet being transferred. These bits define the beginning and end of the data packet so the receiving UART 520 knows when to start reading the bits. The structure of a data packet 530 is illustrated in FIG. 5B, and includes a start bit 532, a parity bit 534, and a stop bit 536. The data 538 being transmitted is sandwiched between the start bit and the parity bit. The data 538 may be between 5 to 9 bits length.

Figure 6A:
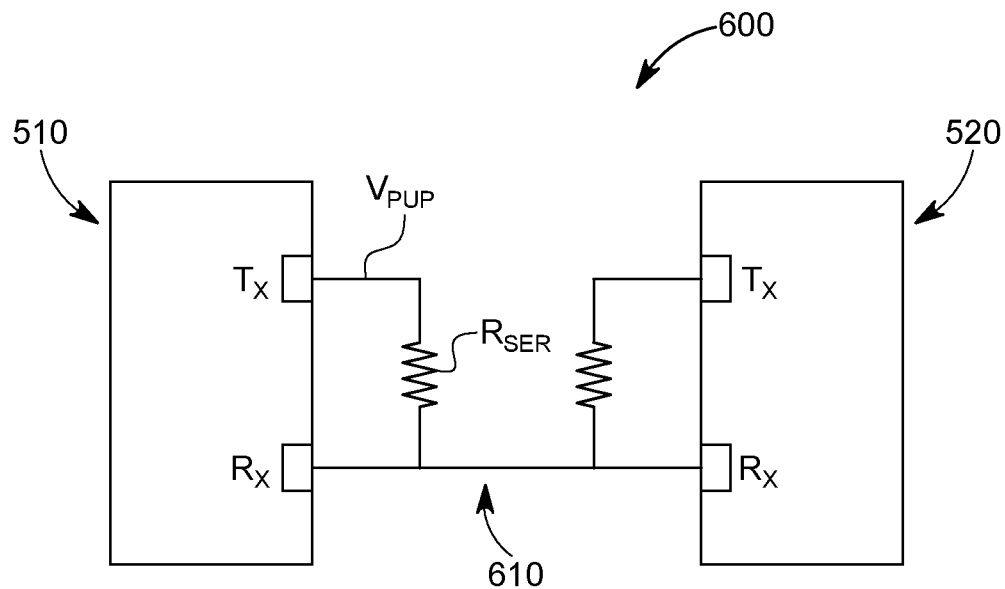
FIG. 6A schematically illustrates an UART based system for exchanging data that uses a single wire for transmitting a single-ended signal to connect the receiver and the transmitter and FIG. 6B illustrates an UART based system that uses a two-wire communication link for transmitting a differential signal.
Figure 6B:
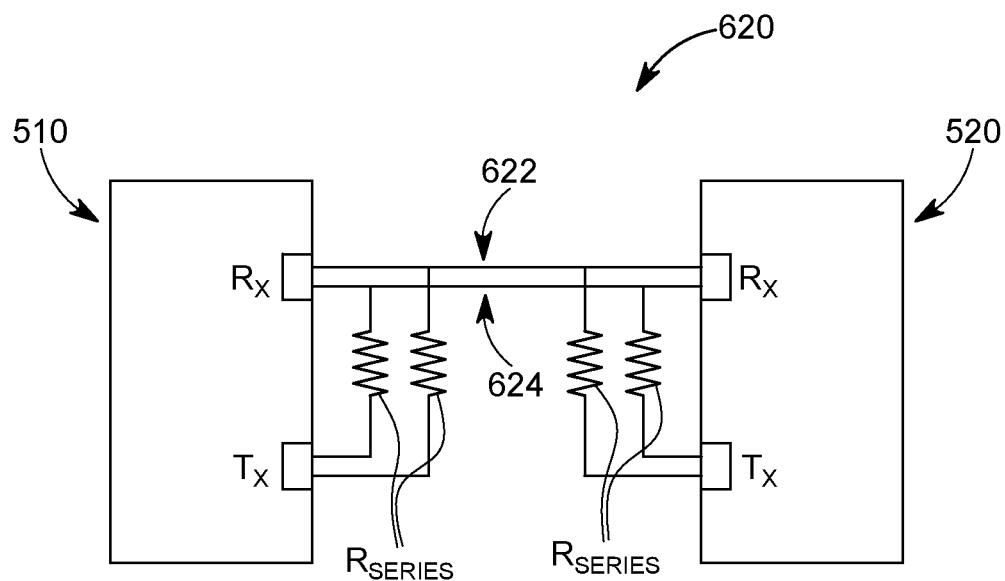

When the receiving UART detects a start bit, it starts to read the incoming bits at a specific frequency known as the baud rate. Baud rate is a measure of the speed of data transfer, expressed in bits per second (bps). Both UARTs must operate at about the same baud rate. The baud rate between the transmitting and receiving UARTs can only differ by about 10% before the timing of bits gets too far off. In one implementation, the UART system may be implemented with a single wire 610, as illustrated in FIG. 6A or with two wires 622 and 624, as shown in FIG. 6B. In both cases, the data exchange is half-duplex, i.e., when one device transmits the data, the other device listens for the data, and the other way around. For this case, the transmitter Tx of each device is connected to its own receiver Rx through a series resistor $R_{SER}$ to protect the transmitter against an incoming signal and/or an arriving wave.

Many existing legacy systems are configured as the system 600 or system 620, i.e., they have either a single wire 610 between a node and a docking station for communication purposes, in which case a single-ended signal is transmitted between the two structures, or two wires 622 and 624, in which case a single differential signal is transmitted between the two structures. For the system 620, the two wires 622 and 624 are usually twisted and the same signal is transmitted with a positive polarity along one wire and with an opposite polarity along the other wire. In the following, the term "single-ended" signal is used when there is a single physical wire between the node and the docking station and the term "differential" signal is used when there are only two physical wires between the node and the docking station. However, in both cases, a single signal is transmitted. Further, the node 510 typically includes a standard microcontroller (µC) that lacks advanced capabilities for USB High Speed, ethernet, or WiFi communications.

Figure 7:
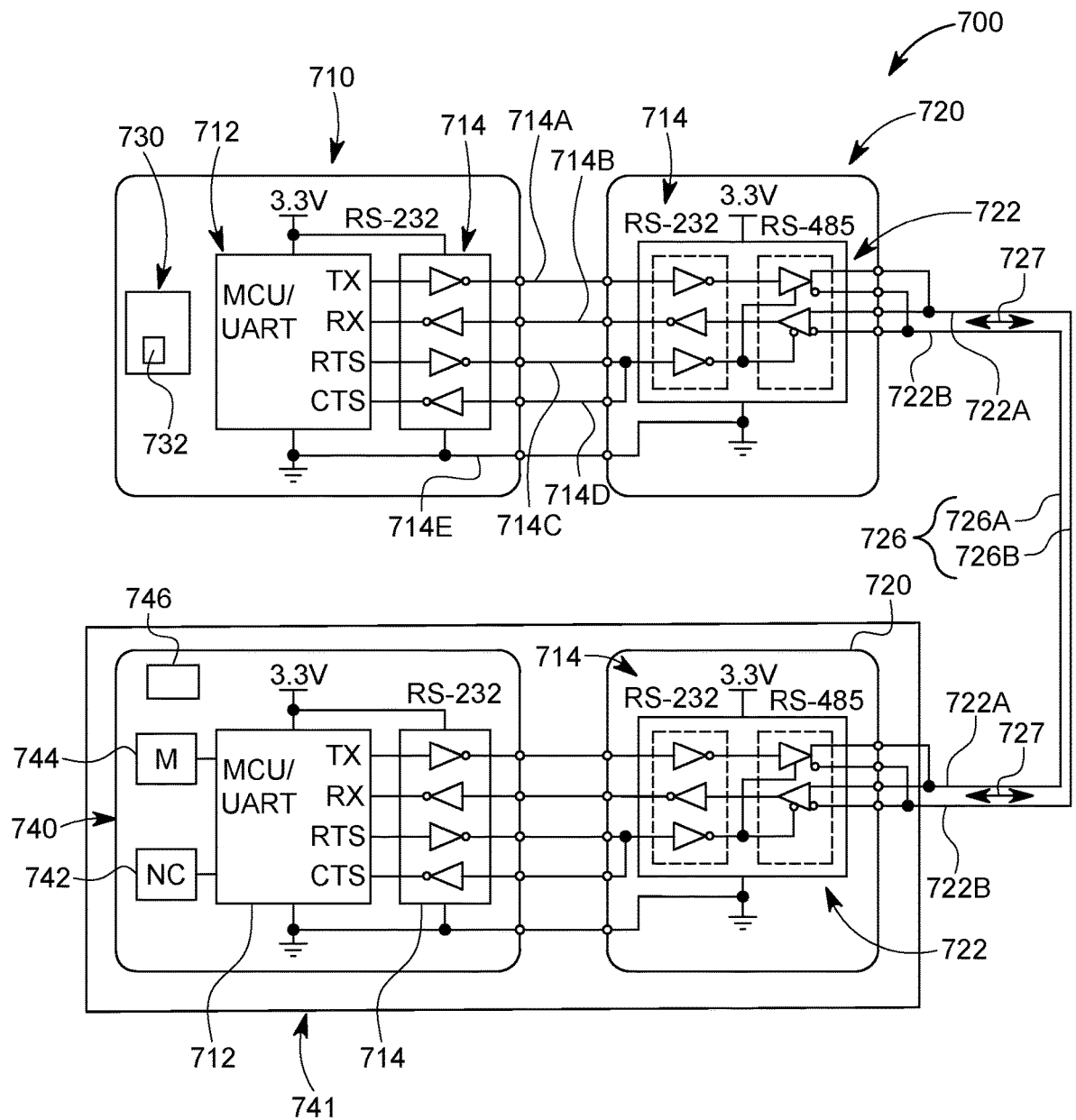
FIG. 7 schematically illustrates a seismic data exchange system that uses the UART protocol for the data exchange.

Such an existing seismic system 700 is schematically illustrated in FIG. 7 and includes a docking station 710 and plural nodes 740 (only one is shown for simplicity). The docking station 710 is shown having an UART module 712 which is in communication with an RS-232 unit 714. The RS-232 is a standard introduced in the 60s for serial communication transmission of data. An interface complying with the RS-232 standard is called herein an RS-232 unit. The RS-232 unit uses four wires 714A to 714D, as shown in the figure, one for the transmitter Tx, one for the receiver Rx, one for the request to send RTS, and one for the clear to send CTS. A fifth wire 714E may be used as the ground. This full-duplex unit is connected to a half-duplex converter 720, which converts the RS-232 signals to RS-485 signals. An RS-485 unit 722 uses only two wires 722A and 722B for communication (as discussed above in FIG. 6B), as this is a half-duplex unit, i.e., is capable to transmitting a single signal only in one direction at a given time. The communication structure of the node 740 is similar to the one of the docking station 710 discussed above and thus, its description is omitted herein. However, the docking station 710 has additional electronics 730, for example, a microprocessor 732, which is described later. The node 740 further includes a microprocessor 742 and a memory unit 744. A battery 746 may also be present inside a housing 741 of the node 740. The two wires 722A and 722B of the converters 720 are connected to corresponding communication wires 726A and 726B, as shown in the figure. The communication wires 726A and 726B may be physically connected to the node 740 and the docking station 710. Thus, all the data communication (i.e., the single signal 727) between the node 740 and the docking station 710 take place along the two-wire path 726.

The microprocessor 742 in the node or the microprocessor 732 in the docking station 710 are connected to corresponding RS-485 drivers for managing the half-duplex electrical interface. With some drivers, for example, Texas Instruments SN65HVD78, one may reach a speed of up to 50 Mbps for data exchange between the node and the docking station. However, with the standard embedded microcontrollers 732 and 742, e.g., having one or more Arm 32-bit Cortex-M or Cortex-A cores, that is not possible. The standard microcontrollers 732 and 742 are defined as having U(S)ARTs communication peripherals and not advanced connectivity like USB High Speed or 100 Mbits Ethernet MAC.

The fastest U(S)ARTs peripherals from microcontrollers for managing half-duplex communication with a UART-type device do not exceed 20 Mbps, e.g., STM32U5xx, iMXRT101x. The only exception is the STM32F7x2 and STM32F7x3, which can reach a speed of up to 27 Mbits. If for each octet of data being transmitted the 1 bit for stop and 1 bit for start are suppressed, the useful rate for these elements is below 16 Mbits. TCP communication with such a support cannot exceed a useful rate of 15 Mbps with Ethernet frames, where the Packet header is 2 bytes, the MAC Ethernet fields is 18 bytes, the IP fields are 16 bytes, the TCP fields are 16 bytes, the Payload data I 1524−(2+ 18+16+16) bytes, and the TCP acknowledge is 2+18+16+16 bytes.

For increasing the flow rate, one could use a dedicated protocol as the Secure Digital Input Output (SDIO) protocol. However, such a new protocol necessitates a complete architecture re-design due to the number of necessary communication paths, with associated costs for material (e.g., additional wires and connectors), which is not practical for the legacy systems.

To overcome these limitations of the legacy systems, according to an embodiment, two different communication protocols are used for data transmission, one for the node to docking station direction and another one for the docking station to node direction. The two communication protocols are appropriate for the hardware currently present in the existing legacy systems. As discussed above, the legacy systems assume that the node has only a standard embedded microcontroller (having one or more Arm 32-bit Cortex-M or Cortex-A cores) that has U(S)ARTs communication peripherals and no advanced connectivity like USB High Speed or 100 Mbits Ethernet MAC. The docking station (also called rack or base station) can integrate an application specific integrated circuit (ASIC) or a field-programmable gate array (FPGA) at a first stage and any standard embedded microcontroller at a second stage, wherein the microcontroller has one or more peripherals with a throughput higher than that of the half duplex link to the node.

In this embodiment, the rack to node communication relies on the UART type asynchronous transmission, which is compatible with any standard microcontroller having one or more Arm 32-bit Cortex-M or Cortex-A cores and having one U(S)ART communication peripheral which minimum throughput is over 9600 bits/s, while the node to rack communication relies on a modified SPI type serial transmission, which is compatible with any standard microcontroller having one or more Arm 32-bit Cortex-M or Cortex-A cores and having one SPI communication peripheral. The modified SPI interface uses less signals than the traditional SPI protocol, to limit the number of necessary signals to effectively a single signal. In this embodiment, not all data typically associated with the SPI protocol are transmitted. Therefore, a FPGA type device may be present in the rack for permitting data decoding and reconstruction. The structure of this novel system is now discussed with regard to FIGS. 8A and 8B.

Figure 8A:
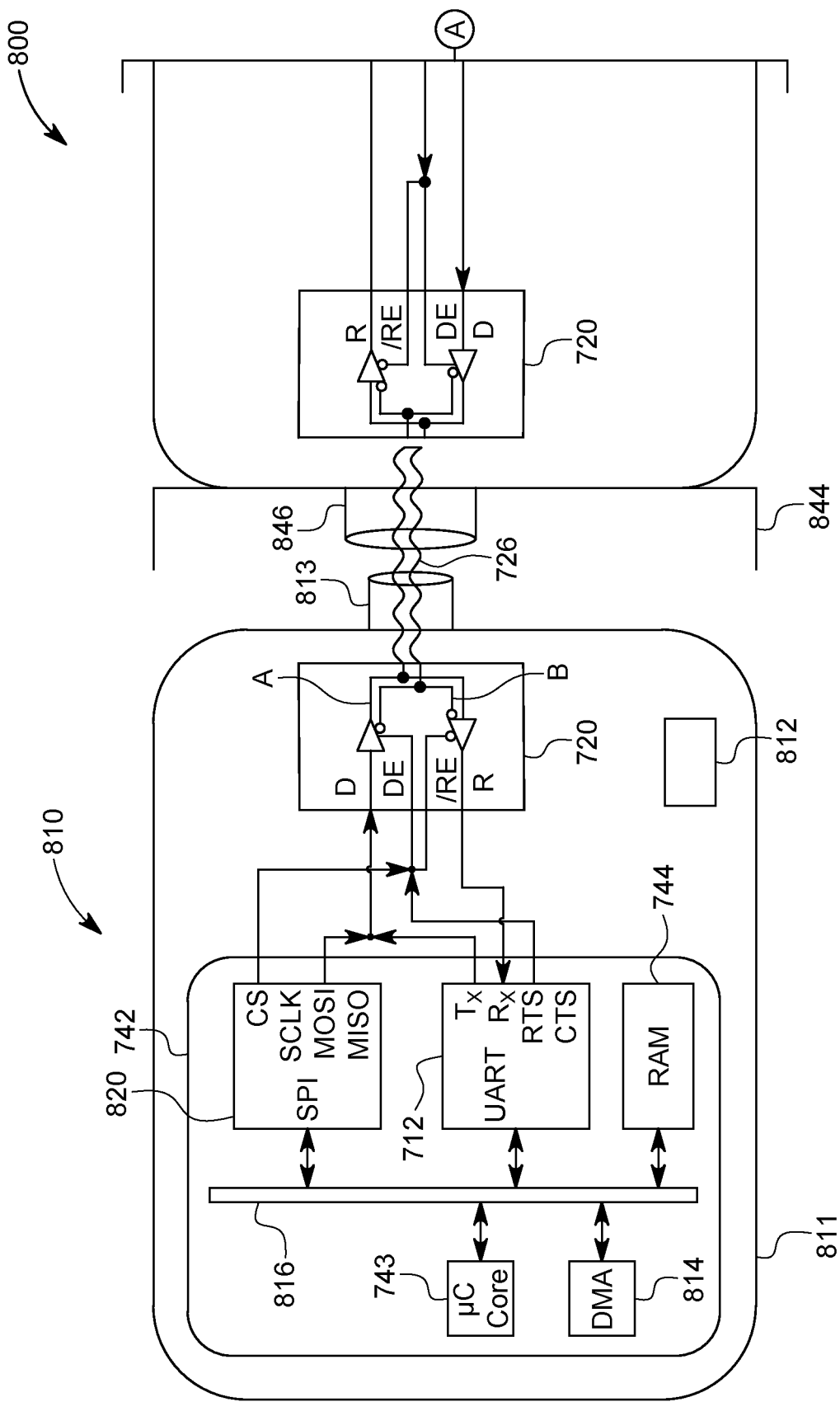
FIGS. 8A and 8B schematically illustrate a novel seismic data exchange system that uses a first protocol from the transmitter to the receiver and a second protocol, different from the first protocol, from the receiver to the transmitter.
Figure 8B:
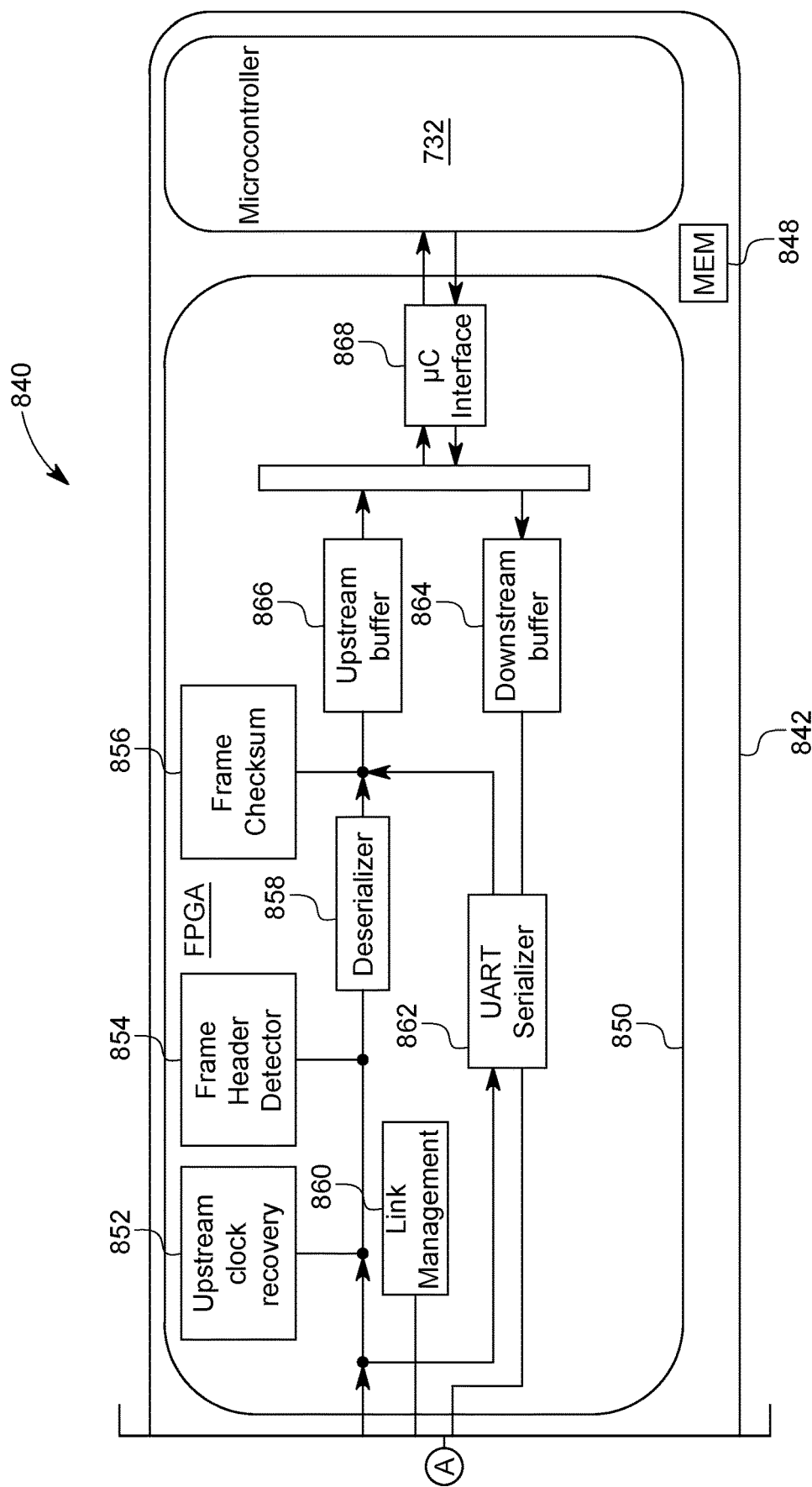

FIGS. 8A and 8B shows a node-docking station system 800 (also called a communication system) that includes plural nodes 810 (only one is shown for simplicity) and one docking station 840. Those skilled in the art would understand that more than one docking station may be used. Also for simplicity, the system 800 is considered to be a seismic acquisition system where each node 810 includes at least one sensor 812 for collecting ambient data 813, for example, seismic data, pressure, temperature, pH, communication data, WiFi signals, Bluetooth signals, visible light, UV light, Xray or radiofrequency data. For example, the sensor 812 may be a seismic sensor, i.e., an accelerometer, a geophone, a pressure sensor, etc. All the components of the node 810 are located within a housing 811. The node 810 further includes a traditional microprocessor 742, which was defined above. The microprocessor 742 includes a microprocessor core 743, and the memory unit 744. The microprocessor 742 may further include a direct memory access (DMA) unit 814, which together with the microprocessor core 743 and the memory unit 744 are connected to a bus 816. A UART module 712 is also connected to the bus 816.

Different from its traditional use, the microcontroller 742 is programmed to have an SPI module 820 (which may be software, hardware or a combination of the two), which is also connected to the bus 816. The SPI module 820 may have the configuration of the module 400 shown in FIG. 4 and discussed above. Thus, its structure is not repeated herein. Because of the presence of the SPI module 820, the connection of the UART module 712 to the transceiver 720 is modified so that both the SPI module 820 and the UART module 712 are connected to the same half-duplex transceiver 720, as shown in the figure. More specifically, the half-duplex transceiver 720 has a first digital input port D, which receives the driver data, a second digital input port DE, which provides a driver enable functionality (i.e., active high signal), a third digital input port R, which receives the output data, and a fourth digital input port RE, which provides a receiver enable functionality (i.e., active low signal). The output of the transceiver 720 is produced at lines A and B as shown in the figure.

When the driver of the microcontroller 742 enables the pin DE to be logic high, the differential outputs A and B follow the logic states at data input D. A logic high at D causes A to turn high and B to turn low. In this case, the differential output voltage defined as $V_{OD}=V_A-V_B$ is positive. When D is low, the output states reverse, B turns high, A is low, and $V_{OD}$ is negative.

When DE is low, both outputs turn high impedance. In this condition, the logic state at D is irrelevant. The DE pin may have an internal pulldown resistor to ground; thus, when left open, the driver is disabled (high impedance) by default. The D pin may also have an internal pullup resistor to $V_{CC}$, the source voltage; thus, when left open while the driver is enabled, output A turns high and B turns low.

When the receiver 840 enables pin RE to be logic low, the receiver is enabled. When the differential input voltage defined as $V_{ID}=V_A-V_B$ is positive and higher than the positive input threshold $V_{IT+}$ the receiver output R turns high. When $V_{ID}$ is negative and lower than the negative input threshold $V_{IT-}$, the receiver output R turns low. If $V_{ID}$ is between $V_{IT+}$ and $V_{IT-}$, the output is indeterminate.

When RE is logic high or left open, the receiver output is high impedance and the magnitude and polarity of $V_{ID}$ are irrelevant. Internal biasing of the receiver inputs causes the output to go failsafe high when the transceiver is disconnected from the bus (open-circuit), the bus lines are shorted (short-circuit), or the bus is not actively driven (idle bus).

To achieve these functionalities, the CS port of the SPI module 820 is connected to both the DE and RE inputs of the transceiver 720 (except when transmission by SPI), the MOSI port is connected to the D input of the transceiver 720, the Tx port of the UART module 712 is connected to the D input of the transceiver 720, and the Rx port of the UART module 712 is connected to the R output of the transceiver 720, as shown in FIGS. 8A and 8B. This specific configuration of port connections between the SPI module 820, UART module 712 and the half-duplex transceiver 720 enable the implementation of the dual protocol communication between the node 810 and the docking station 840, with SPI protocol communication from the node 810 to the docking station 840 and with the UART protocol communication from the docking station 840 to the node 810.

Note that the clock port SCLK of the SPI module 820 is not connected to the half-duplex transceiver 720, which means that although the SPI protocol is used, it is not synchronous as no clock signal are exchanged between transceivers 720. This means that the SPI protocol has been altered for this embodiment, as discussed later. This is so because the communication link 726 includes only two wires (see FIG. 7) and only a single differential signal 727 is transmitted along path 726.

The half-duplex transceiver 720 in the node 810 is connected through the two-wire communication path 726 to a similar half-duplex transceiver 720 in the docking station 840. The description of the half-duplex transceiver 720 in the docking station 840 is omitted herein as it is similar to that of the transceiver 720 in the node 810. The transceiver 720 is connected to an FPGA 850 and the FPGA 850 is connected to the microcontroller 732. All these elements are placed in a housing 842. The FPGA 850 is not traditionally found in the docking station 840. The FPGA 850 is added in this embodiment between the half-duplex transceiver 720 and the microcontroller 732 to recover and transform the received signal 727. For this purpose, the FPGA 850 is modified relative to a traditional FPGA to further include an upstream clock recovery module 852, a frame header detector 854, a frame checksum 856, and a deSerializer module 858. These modules are in addition to the traditional modules of link management 860, UART serializer 862, downstream buffer 864, upstream buffer 866, and microprocessor interface 868. In one application, the upstream clock recovery 852 (for bit synchronization) is configured to create a clock from rising edges and falling edges of the upstream signal, the frame header detector 854 (for frame synchronization) is configured to search for a specific known pattern to isolate specific fields of the frames, the Frame Checksum 856 is configured to check that the frame is not corrupted, the deSerializer module 858 is configured to aggregate data transferred bit to bit (in serial), in bytes or 32-bits words, the link management 860 is configured to decide when the Rack module transmits data or when it receives it, the UART Serializer 862 is configured to prepare data to be sent bit to bit toward the transceiver 720, the downstream buffer 864 may be a memory area that temporarily stores data, and the upstream buffer 868 may be another memory area that temporarily stores data.

In one application, the housing 842 has plural receiving units 844 (only one is shown for simplicity) for receiving the housing 811 of the node 810, as disclosed, for example, in U.S. Pat. No. 11,022,708. For this configuration, the node 810 becomes in direct contact with the docking station 840 and the two-wire communication path 726 is actually replaced by a direct contact between a male plug 813 of the node 810 and a female plug 846 of the docking station. In one variation of this embodiment, the male plug 813 is a female plug and the female plug 813 is a male plug. Any other mechanical connections that achieve an electrical connection of only two wires between the node and the docking station may be used.

Figure 9:
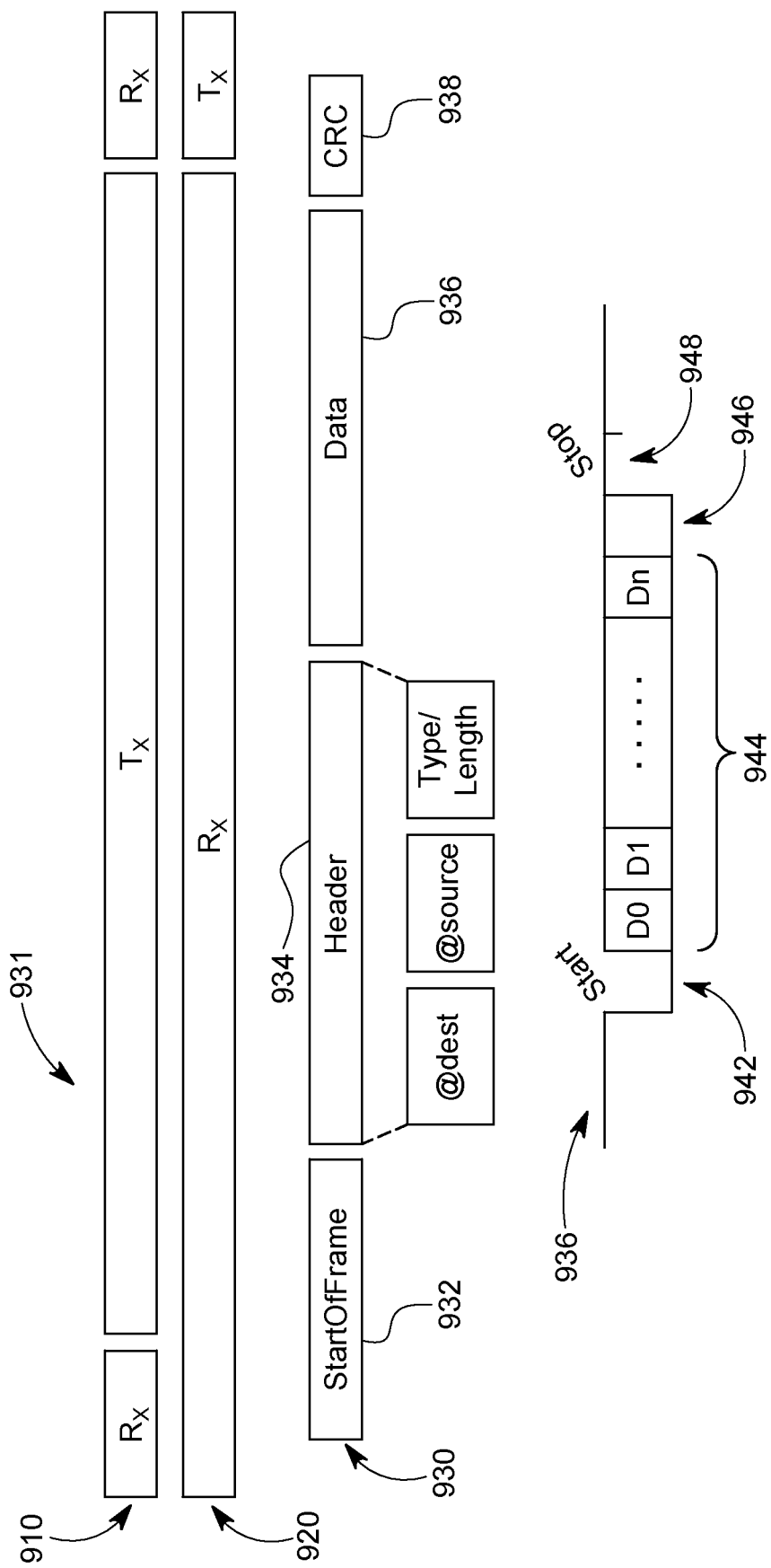
FIG. 9 schematically illustrates the transmission states of the receiver and transmitter and the structure of the message sent by one of the transmitter and receiver.
Figure 10:
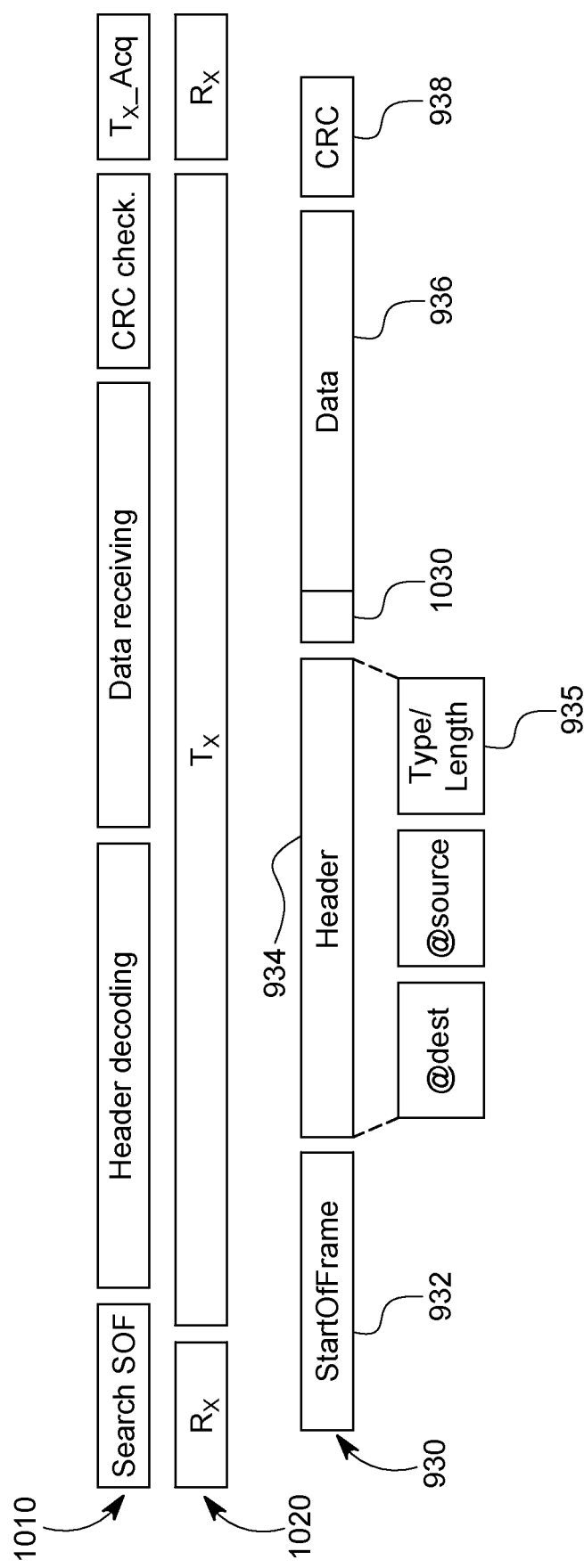
FIG. 10 schematically illustrates the transmission states of the receiver and transmitter and the structure of the message sent by the other one of the transmitter and receiver.

The configuration of the packets exchanged between the node 810 and the docking station 840 is now discussed with regard to FIGS. 9 and 10. For the docking station to the node data flow, the system 800 relies on the UART protocol, which is compatible with any legacy microcontroller. The docking station's states 910 and the node's states 920 during the communication period are illustrated in FIG. 9, with the states divided between Rx and Tx periods. More specifically, the docking station 840 sends a command or message 931 during a Tx period to the node, through an asynchronous link, e.g., UART. The length of the field is n bytes, with each message 930 made of several fields: a start of frame 932, a header 934, a data portion 936, and a cyclic redundancy check (CRC) 938. The header 934 may include, as shown in FIG. 9, a destination address, a source address, and the type and/or length of the data to be transmitted. This message 930 is received by the node 810 during the Rx period. The data 936 may include a start bit 942 which is always at logic 0, followed by the byte to be transmitted 944, an optional parity bit 946, and a stop bit 948, which is at logic 1; preferably, each byte includes such sequence 942, 944, 946, 948.

When the node sends data (single signal 727) to the docking station, the SPI protocol is modified so that no communication clock SCLK is transmitted due to the limitation of media (single wire) or its physical interface driver. Also, neither the SPI chipselect nor MISO signal is transmitted. FIG. 10 shows the docking station's states 1010 and the node's states during such communication, with the states divided between Rx and Tx periods. The node 810 transmits the DATA 936 but not the associated clock information. The node's microcontroller is configured to add the start of frame 932 (e.g., a known pattern), which is used by the FPGA 850 of the docking station 840 to detect the start of transmission and to adjust its internal clock to the node's internal clock. The docking station's clock is then maintained in phase with the node's clock during the message transmission. In one application, a "clock synchronization pattern" 1030 may be inserted in the message 930 so that the docking station is able to keep its clock synchronized to the internal clock of the node. The pattern 1030 may be inserted anywhere in the message 930 but at specific positions, predetermined (fixed) with regard to the start of frame 932: for example, a clock synchronization pattern every 200 bytes.

The FPGA 850 is inserted into the docking station 850 to decode the message 930. For this reason, the FPGA is configured to detect the "start of frame," maintain the docking station's clock synchronized to the node's clock and detects the "end of transmission." The microcontroller 732 then accesses the message extracted by the FPGA 850 to read the message sent by the node 810. The upstream throughput of such architecture is several tens of Mbps. The length of the field 935 is used by the FPGA 850 to detect the position of the CRC field 938 and to detect the end of transmission.

The system 800 discussed above achieves an improvement of the physical transmission rate, in the node to rack direction, by using the modified SPI type protocol, managed by a standard microcontroller, without additional constraints (one signal to transmit, and CPU frequency similar to the physical transmission rate). In particular, such system can reach the maximum capabilities of the interface/transceiver, unlike the current situation where the node-docking station throughput is limited to 20 Mbps maximum with UART protocol and a minimum CPU frequency of 160 MHz. Much higher UART throughput is not supported by microcontrollers, in particular when low cost and/or low power consumption. The table shown in FIG. 11 illustrates the maximum flow rates between the node and the docking station when the modified SPI protocol is used and for two different interfaces/converters 720. Note that the interface/converter 720 may be a 60 GHZ RF transceiver, or an optical transceiver (like a laser diode).

The system 800 may also achieve lower Tx/Rx switching latency at each transmission and thus, better throughput. In one application, the system 800 may be configured to have automatic insertion of resynchronization words if needed. For example, the DMA 814 may be used to automatically insert resynchronization words inside messages 930 at some specific positions. Another implementation could be made in software (for example, in the CPU) instead of hardware (the DMA) but this approach is not as efficient because of the memory moves that need to be performed by the software. These advantages make it possible to read data from a node faster, without adding complexity to the node. This means cost and power optimization at the node. The software complexity is reduced by using signals or peripherals internal to the microcontroller.

Figure 12A:
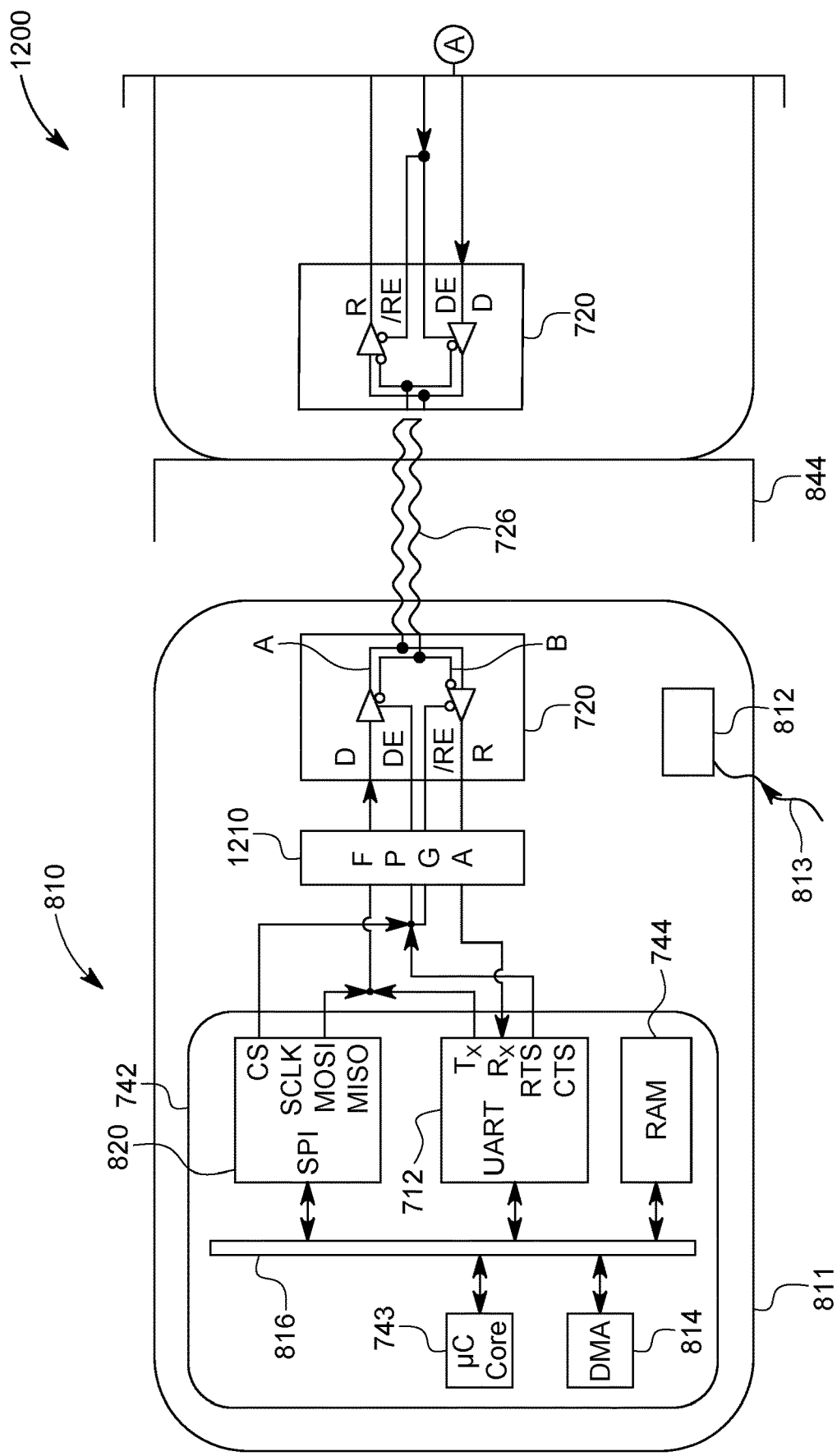
FIGS. 12A and 12B illustrate a variation of the embodiment shown in FIGS. 8A and 8B, in which the node is modified to have an FPGA card
Figure 12B:
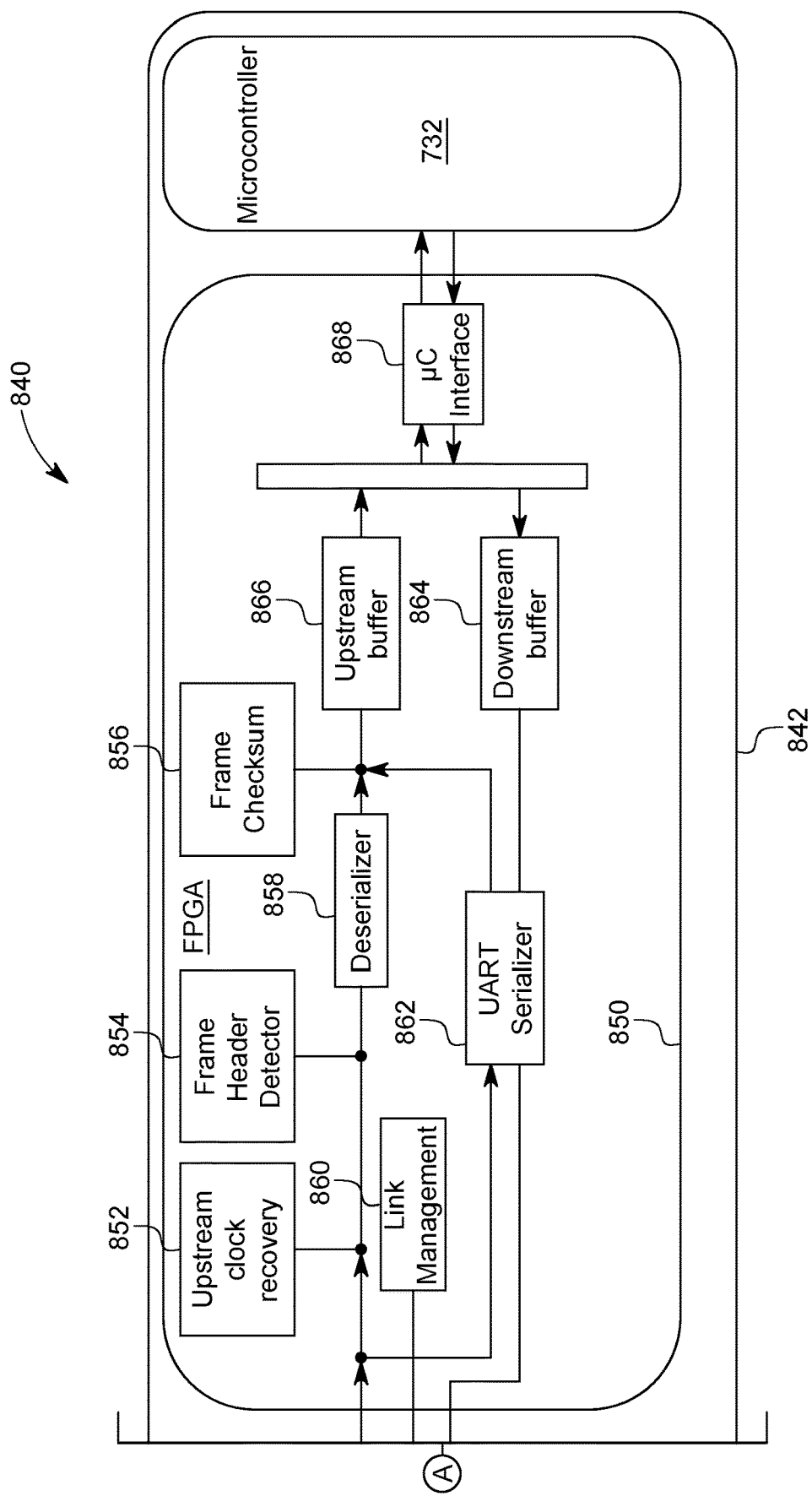

In another embodiment, as illustrated in FIGS. 12A and 12B, for further increasing the flow rate of information from the docking station 840 to the node 810, it is possible to use the SPI protocol in both directions, by integrating a FPGA chip 1210 in the node 810. Thus, the node architecture for this embodiment would be different from the node 810 in FIGS. 8A and 8B in the sense that the FPGA 1210 is intercalated between the microprocessor 742 and the half-duplex transceiver 720. The FPGA card 1210 may be configured to be similar to the FPGA card 850. In this way, the communication in both directions is increased. Note that this approach requires a hardware modification of an existing node 810 or manufacturing new nodes that have the FPGA chip.

According to another embodiment, for obtaining higher throughput from the docking station to node direction, which does not require a node hardware modification, i.e., without adding a FPGA, the following procedure may be implemented. The node 810 initiates requests (with frames) to ask the docking station to send data. In response, the docking station 840 sends frames (data) 930 to the node 810 based on the last recovery clock (current frame) and by delaying it. This delay considers transfer latency of the transceiver (back and forth) and resampling delays. The microcontroller 742 of the node 810 receives the frames on its SPI module 820. Each bit of the frame will be sampled by the SPI module's clock. The challenge for this embodiment would be to ensure that the bit sampling is reliable (in the middle of each bit).

Figure 12C:
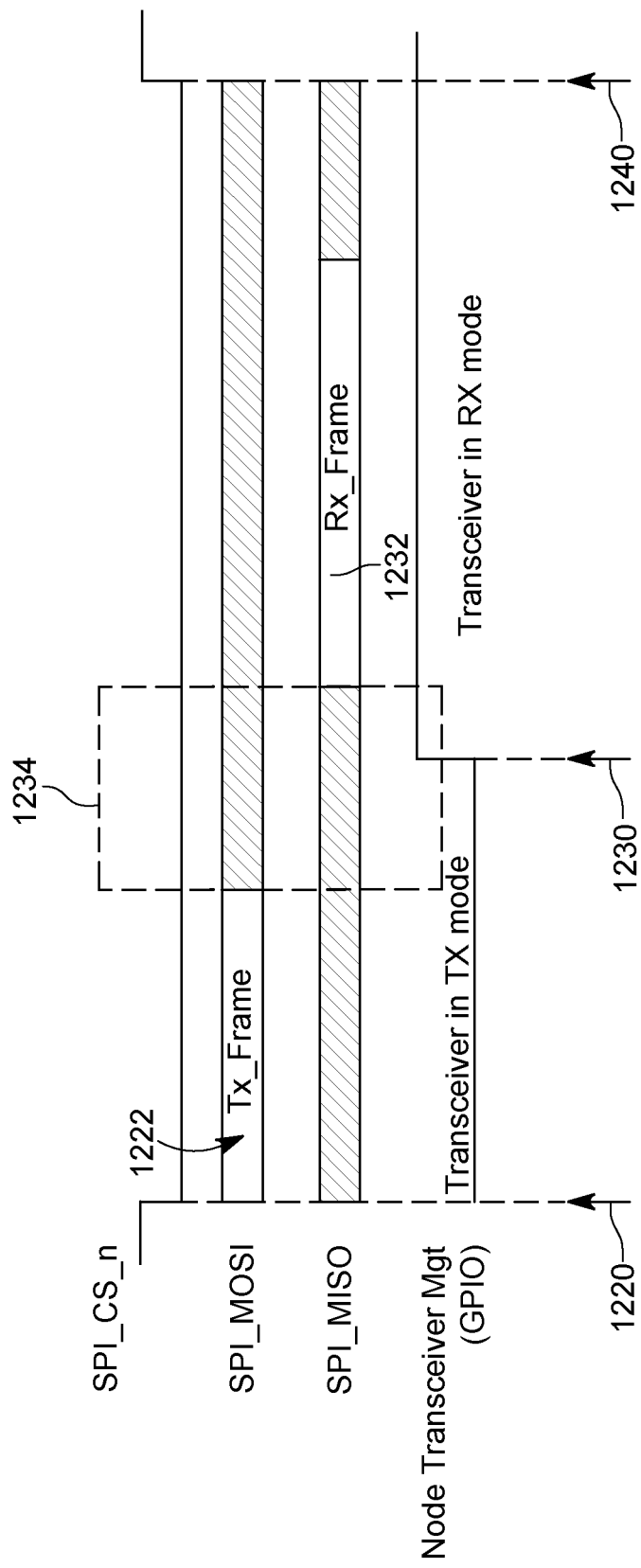
FIG. 12C illustrates the SPI signal management at the node side without transmitting a clock signal to the docking station.

For this embodiment, at the docking station 840, a transition from a reception period (end of frame sent by the node 810) to a transmission period is managed and performed by the FPGA 850. At the node 810, the transition from transmission to reception is implemented as now discussed with regard to FIG. 12C. Note that the SPI_MOSI connection transmits data from the node 810 to the docking station 840 while the SPI_MISO connection transmits data from the docking station 840 to the node 810. Thus, the transmission from the node takes place on the SPI_MOSI connection and the reception at the node takes place on the SPI_MISO connection. Starting with the transmission period from the node 810 to the docking station 840, arrow 1220 in FIG. 12C shows the start of the modified SPI transaction and also the start of the internal timer of the node 810. The Tx frame 1222's length is converted into a time duration with an addition of some margin and this is the Timer_Value. At the same time, the beginning of the modified SPI transaction (also indicated by arrow 1220) is synchronized with an internal Timer of the microcontroller 743. When the Timer in the node reaches the Timer_Value, a general-purpose input/output (GPIO) connection drives the transceiver in order to switch to the Receive mode, as indicated by arrow 1230. A margin 1234 between the last received TX frame 1222 and a first received Rx frame 1232 is selected to be larger than a difference between the switch time 1230 and the end of the Tx frame 1222. The microcontroller 743 is now listening to what is happening on the SPI_MISO connection, and then detects and read the Rx Frame 1232 sent by the docking station 840. The modified SPI transaction is closed at time 1240, after the Rx_frame 1232 is completely received. In this way, for this embodiment, there are two similar, synchronous but half duplex, signals exchanged between the node and the docking station, namely a "modified SPI" signals that use the SPI protocol but not the transmission of any clock signal. Not that the traditional SPI protocol requires the transmission of the clock signal between two parties that exchange information. For this embodiment, all the features discussed above with regard to the other embodiments may be applied. In one application, both the node and the docking station may have an SPI module that is configured to generate a clock signal but both are modified to not send the clock signal to the other module. In other words, for this embodiment, both the node and the docking station (the first and second modules) use synchronous protocols with half duplex communication.

Several recovery clock algorithms may be used in the FPGA card 850. According to a first approach, the data is oversampled by a factor of 4 or more to secure the Ethernet frames transmission (up to 1538 bytes) considering that: (1) the frequency accuracy of the node's clock and the docking station's clock is +/−2.5 ppm or lower, and (2) the data jitter is lower than 20% of the symbol duration. For this approach, note that jumbo frames (up to 9 k bytes) may be transmitted by the system 800 if the clock accuracy is better than +/−1 ppm and if the data is oversampled by a factor of 6.

According to a second approach, a multiphase clock block may be used to sample the received data. An external block is in charge of detecting the "start of frame" and of selecting the phase that is closer to the middle of the bit. A minimum of 6 different phases may be used in this embodiment.

In one application, the throughput may be optimized by limiting the overhead due to the clock synchronization pattern. If the docking station's clock frequency=node's clock frequency, there is no need of inserting the synchronization pattern in the message 930. The clock synchronization patterns may be inserted by (a) dedicated algorithms of insertion of clock synchronization patterns by the microcontroller, (b) copy/paste actions performed by the CPU to insert clock synchronization patterns, and/or (c) use of a scatter-gather DMA to insert clock synchronization patterns automatically. For this last application, the CPU creates a chain of buffer descriptors, alternating message contents and synchronization patterns. This technic is useful to avoid any memory copy.

Figure 13:
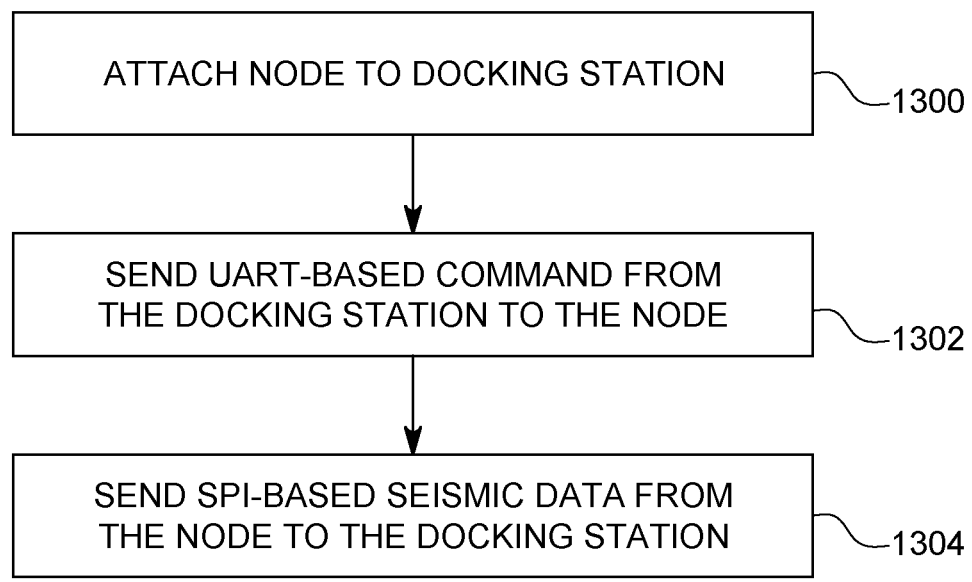
FIG. 13 is a flow chart of a method for exchanging data between the node and the docking stations based on the UART and SPI protocols.

A method for exchanging data between the node and the docking station for the system 800 is now discussed with regard to FIG. 13. After the node is brought from the field, it is physically attached in step 1300 to the docking station. As shown in FIGS. 8A and 8B, a port 813 of the node 810 directly connects to a port 846 of the docking station 840 to establish the two-wire single signal connection path 726. In step 1302, the docking station 840 sends a command 931 through the UART protocol to the node 810. The command 931 may include instructions for the node to dump its stored seismic data to a storage device 848 located in the docking station. In one implementation, the storage device 848 acts as a buffer for the seismic data before being transferred to a server or other remote location for analysis (i.e., generating a seismic image of the surveyed subsurface). In step 1304, the node sends the seismic data from its memory 744 to the docking station, through the SPI module 820, using the SPI protocol, but without sending the clock signal and the chipselect signal. In this way, the transmission speed from the node to the docking station thought the single signal is improved when compared to the existing legacy systems.

The disclosed embodiments provide a docking station and at least one node that exchange data based on two different protocols, a first protocol that is asynchronous and a second protocol that is synchronous but is modified to act as an asynchronous one. In one application, the first protocol is UART and the second protocol is SPI. The system formed by the node and the docking station uses basic microcontrollers, i.e., processors that do not have USB High Speed, 100 Mbits Ethernet MAC, or WiFi capabilities It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A communication system comprising:
a node configured to collect ambient data with a sensor; and
a docking station configured to couple to the node and to establish a communication path with the node through only one signal along one or two wires,
wherein the node includes,
a first module configured to use a first data communication protocol for receiving commands from the docking station along the communication path, and
a second module configured to use a second data communication protocol for sending the ambient data to the docking station along the communication path,
wherein the first data communication protocol is different from the second data communication protocol, the first data communication protocol is asynchronous and the second data communication protocol is a modified synchronous protocol,
wherein the first data communication protocol is a Universal Asynchronous Receiver/Transmitter, UART, protocol, and the second data communication protocol is a Serial Peripheral Interface, SPI, protocol
wherein the second module is an SPI module that is modified to not transmit a clock signal to the docking station,
wherein the SPI module is configured to not send a chipselect signal to the docking station; and
wherein the node includes a legacy microcontroller, which is not configured to implement USB high speed, 100Mbits Ethernet MAC or WiFi protocols.

2. The system of claim 1, wherein the first module is configured to not send a clock signal.

3. The system of claim 2, wherein the second module is configured to generate a clock signal but the clock signal is not sent from the node to the docking station.

4. The system of claim 1, wherein the node further comprises:
a half-duplex transceiver functionally connected to the first and second modules and configured to transform a full duplex signal from the second module to a half-duplex signal.

5. The system of claim 1, wherein the node further includes a field programable gate array, FPGA, connected between a microprocessor and a half-duplex transceiver.

6. The system of claim 1, wherein the docking station includes:
a half-duplex transceiver connected to the only one or two wires;
a field programable gate array, FPGA, functionally connected to the half-duplex transceiver; and
a microprocessor functionally connected to the FPGA,
wherein the FPGA is configured to decode the ambient data received from the node.

7. The system of claim 1, wherein the node includes a first plug and the docking station includes a second plug and the first plug mechanically engages the second plug to establish the communication path.

8. The system of claim 1, wherein the node is a seismic node and the sensor is an accelerometer or geophone.

9. A seismic data acquisition node comprising:
a housing;
a seismic sensor attached to the housing; and
a microprocessor configured to receive seismic data collected by the seismic sensor and transmit the seismic data to a docking station,
wherein the node is configured to establish a communication path with the docking station through only a single signal along one or two wires, and
wherein the microprocessor includes:
a first module configured to use a first data communication protocol for receiving commands from the docking station along the communication path, and
a second module configured to use a second data communication protocol for sending the seismic data to the docking station along the communication path,
wherein the first data communication protocol is different from the second data communication protocol, the first data communication protocol is asynchronous, and the second data communication protocol is a modified synchronous protocol,
wherein the first data communication protocol is a Universal Asynchronous Receiver/Transmitter, UART, protocol, and the second data communication protocol is a Serial Peripheral Interface, SPI, protocol
wherein the second module is an SPI module that is modified to not transmit a clock signal to the docking station,
wherein the SPI module is configured to not send a chipselect signal to the docking station; and
wherein the node includes a legacy microcontroller, which is not configured to implement USB high speed, 100Mbits Ethernet MAC or WiFi protocols.

10. The node of claim 9, wherein the first module is configured to not send a clock signal.

11. The node of claim 10, wherein the second module is configured to generate a clock signal, but the second module is configured to not send the clock signal to the docking station.

12. The node of claim 9, further comprising:
a half-duplex transceiver functionally connected to the first and second modules and configured to transform a full duplex signal from the second module to a half-duplex signal.

13. A docking station for receiving seismic data from a seismic node, the docking station comprising:
a housing;
a half-duplex transceiver located in the housing and connected to the seismic node through a communication path having only one or two wires;
a field programable gate array, FPGA, located in the housing and functionally connected to the half-duplex transceiver; and
a microprocessor located in the housing and functionally connected to the FPGA,
wherein the FPGA is configured to decode the seismic data received from the node along the communication path using a Serial Peripheral Interface, SPI, protocol,
wherein the seismic node includes an SPI module that is modified to not transmit a clock signal to the docking station,
wherein the SPI module is configured to not send a chipselect signal to the docking station; and
wherein the seismic node includes a legacy microcontroller, which is not configured to implement USB high speed, 100 Mbits Ethernet MAC or WiFi protocols.

14. The docking station of claim 12, wherein the FPGA is configured to not transmit a clock signal and a chipselect signal to the node.

15. A communication system comprising:
a node configured to collect ambient data with a sensor; and
a docking station configured to couple to the node and to establish a communication path with the node through only one signal along one or two wires,
wherein the node includes,
a first module configured to use a data communication protocol for receiving commands from the docking station along the communication path, and
a second module configured to use a same data communication protocol for sending the ambient data to the docking station along the communication path,
wherein the data communication protocol is a modified synchronous protocol in which the node and the docking station do not exchange a clock signal,
wherein the data communication protocol is a Serial Peripheral Interface, SPI, protocol
wherein the second module is an SPI module that is modified to not transmit a clock signal to the docking station,
wherein the SPI module is configured to not send a chipselect signal to the docking station; and
wherein the node includes a legacy microcontroller, which is not configured to implement USB high speed, 100 Mbits Ethernet MAC or WiFi protocols.

* * * * *